Oct. 2, 1928.
H. MORGAN
1,686,025
LUBRICATION OF BRAKE SHAFTS
Filed Oct. 19, 1927
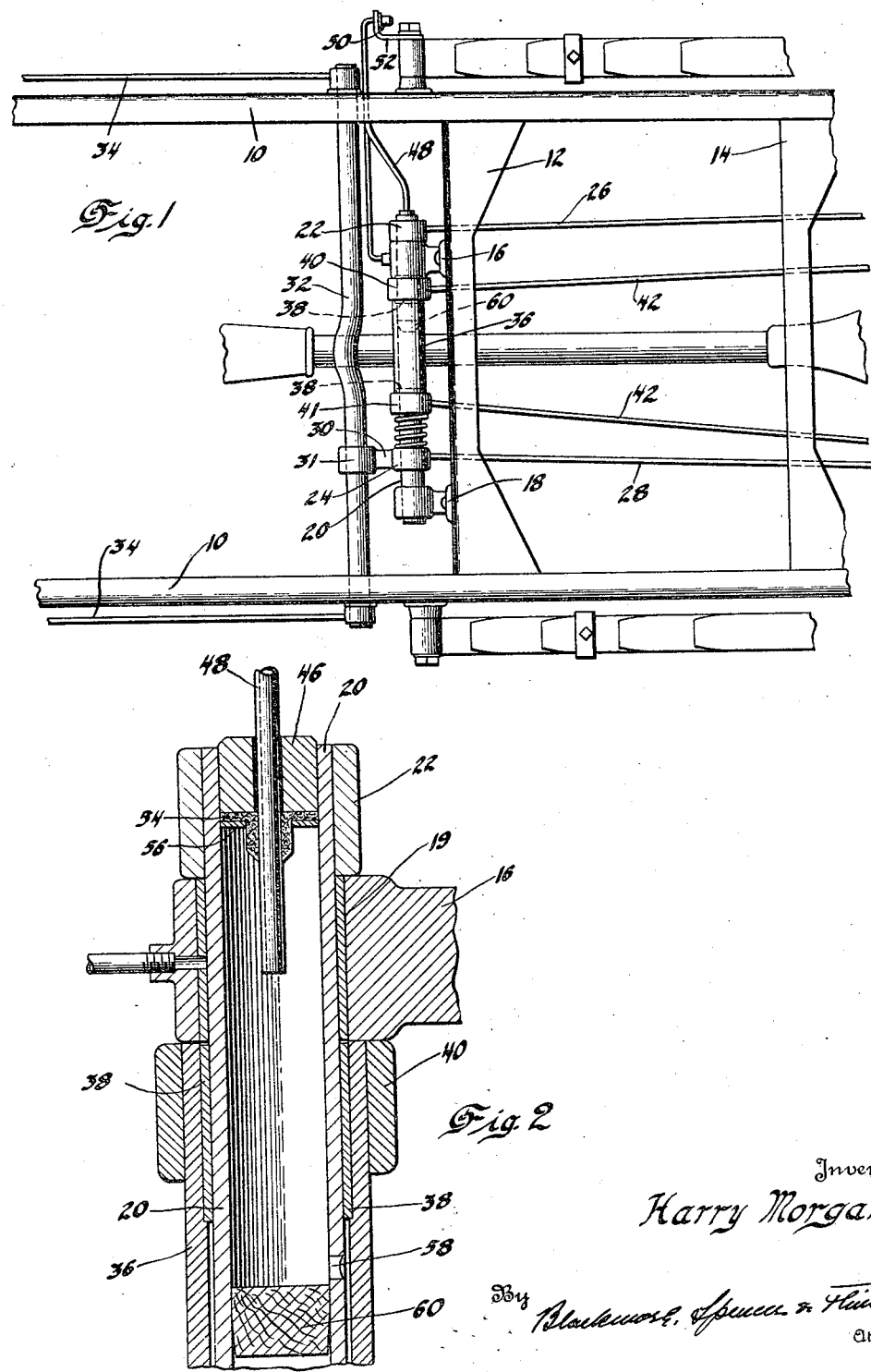
Inventor
Harry Morgan Patented Oct. 2, 1928.

1,686,025

UNITED STATES PATENT OFFICE.

HARRY MORGAN, OF FLINT, MICHIGAN, ASSIGNOR TO GENERAL MOTORS CORPORATION, OF DETROIT, MICHIGAN, A CORPORATION OF DELAWARE.

LUBRICATION OF BRAKE SHAFTS.

Application filed October 19, 1927. Serial No. 227,158.

This invention relates to lubricating means for the brake shaft of an automotive vehicle.

In brake mechanism of this kind there are ordinarily two hollow shafts independently rotatable, one being journaled on the other. Since both shafts are intermittently rocked, it has hitherto been difficult to adequately lubricate the bearing surfaces between them. It is an object of this invention to provide a lubricating tube extended to an accessible point on the car and so connected with the brake shafts that lubricant may be supplied to the bearing surface between the outer and inner shafts. It is a further object of the invention to provide such a lubricating means that will not interfere with nor will be interfered with by rocking of either shaft.

Other objects and advantages of the invention will appear in the course of the following description, taken in connection with the accompanying drawing and appended claims.

In the drawing:

Figure 1 is a plan view of a portion of the chassis of an automotive vehicle embodying my invention.

Figure 2 is an enlarged view, partly in section, of the brake shaft.

Referring to the drawing, I have illustrated in Figure 1 a portion of the chassis of an automotive vehicle comprising the usual channeled side frame members 10 and cross members or braces 12 and 14. Fixed to the forward side of the cross member 12 are bearing brackets 16 and 18 in which are supported the brake shafts.

Rotatably supported in the bearing surfaces 19 in brackets 16 and 18 is a hollow shaft 20. Clamped to the hollow shaft 20 at points adjacent the opposite ends thereof are the sleeve portions of downwardly extending arms 22 and 24, the lower ends of which are connected with the forward ends of the rods 26 and 28 respectively for actuation of the internal rear wheel brakes. Rocking of shaft 20 is transmitted through link 30 to arm 31 on shaft 32 journaled in frame members 10 for reciprocating rods 34 for actuation of the front wheel brakes. Shaft 20 is rocked by the usual connection with the foot pedal (not shown).

Rotatably mounted on shaft 20 is a shorter hollow shaft 36 having an internal diameter slightly larger than the external diameter of shaft 20. Shaft 36 is provided at opposite ends on its inner surface with bushings 38 fitting snugly about shaft 20. At opposite ends on its outer surface are clamped the sleeve portions of downwardly extending arms 40 and 41, the lower ends of which are connected respectively with the forward ends of rods 42 extended rearwardly for connection with the external brake bands for actuation thereof. Shaft 36 is rocked by its usual connection with the hand brake (not shown).

A coil spring surrounds shaft 20 between shaft 36 and arm 24 and prevents movement of inner shaft 20 to the right, or upward as shown in Figure 1. Bracket 16 prevents movement of shaft 20 to the left. The spring also holds shaft 36 up against bracket 16 and prevents rattling.

Press fitted in the end of shaft 20 is a metallic plug 46 provided with a central aperture through which extends lubricating tube 48 provided with a fitting 50 mounted on the usual bracket 52 fixed to the side of the chassis. A washer of leather or similar material surrounds tube 48 and extends radially therefrom thus contacting with the inner surface of plug 46. A metallic washer 56 surrounds tube 48 and the axially extending portion of washer 54.

A small aperture 58 is provided in shaft 20 at an intermediate point and opens within shaft 36 between the two bushings 38. Within shaft 20 adjacent opening 58 and opposite plug 46 is a wooden plug 60. This plug fits tightly in order to withstand a small amount of pressure occasioned by the forcing in of the lubricant. When lubricant is forced into fitting 50, it passes through tube 48 into inner shaft 20 and thence through aperture 58 into the space between shafts 36 and 20. From this space it is forced out and lubricates the bearing surfaces between shaft 20 and bushings 38. The escape of lubricant between tube 48 and plug 46 is prevented by the lubricant pressure which causes leather washer 54 to hug the tube 48 tightly. When the oil pressure is relieved, the leather washer expands and loosens its grip on tube 48 and permits shaft 20, plug 46 and washers 54 and 56 to rotate freely during the operation of the braking mechanism, while tube 48 remains stationary.

I claim:

1. In a brake shaft assembly for support on a vehicle chassis, a hollow inner brake actuating shaft, a hollow outer brake actuating shaft journaled on said inner shaft, a bearing support for said shafts on the chassis permitting independent rocking movement of said shafts, said inner shaft being closed at one end, and a fixed lubricating tube extending in the other end of said inner shaft by a connection permitting rotation of the shaft relative to the tube but preventing the escape of lubricant, said inner shaft being provided with an aperture opening into said outer shaft.

2. In a brake shaft assembly for support on a vehicle chassis, a hollow inner brake actuating shaft, a hollow outer brake-actuating shaft journaled on said inner shaft, a bearing support for said shafts on the chassis permitting independent rocking movement of said shafts, said inner shaft being closed at one end and provided with an apertured plug fixed in the other end and a lubricating tube extending through said aperture and provided with a washer bearing against said plug and tube for preventing the escape of lubricant, said inner shaft being provided with an aperture opening into said outer shaft.

In testimony whereof I affix my signature.

HARRY MORGAN.